US012748564B2

(12) United States Patent
Kwatinetz et al.

(10) Patent No.: US 12,748,564 B2
(45) Date of Patent: Sep. 29, 2026

(54) DYNAMIC VOLUME CONTROL

(71) Applicant: Sonos, Inc., Santa Barbara, CA (US)

(72) Inventors: Andrew Kwatinetz, Seattle, WA (US); Jodi Vautrin, Somerville, MA (US); Dayn Wilberding, Portland, OR (US); Paula Barraza, Oceanside, CA (US)

(73) Assignee: Sonos, Inc., Goleta, CA (US)

( * ) Notice: Subject to any disclaimer, the term of this patent is extended or adjusted under 35 U.S.C. 154(b) by 177 days.

(21) Appl. No.: 18/475,020

(22) Filed: Sep. 26, 2023

(65) Prior Publication Data

US 2024/0111483 A1 Apr. 4, 2024

Related U.S. Application Data

(60) Provisional application No. 63/412,009, filed on Sep. 30, 2022.

(51) Int. Cl.
*G06F 3/16* (2006.01)

(52) U.S. Cl.
CPC .............. *G06F 3/165* (2013.01); *G06F 3/167* (2013.01)

(58) Field of Classification Search
CPC ................................. G06F 3/165; G06F 3/167
See application file for complete search history.

(56) References Cited

U.S. PATENT DOCUMENTS

| | | | | |
|---|---|---|---|---|
| 5,303,371 A * | 4/1994 | Nakajima | H03G 1/0088 | 381/109 |
| 5,440,644 A | 8/1995 | Farinelli et al. | | |
| 5,745,057 A * | 4/1998 | Sasaki | H03G 3/001 | 341/35 |
| 5,761,320 A | 6/1998 | Farinelli et al. | | |
| 5,923,902 A | 7/1999 | Inagaki | | |
| 6,032,202 A | 2/2000 | Lea et al. | | |
| 6,256,554 B1 | 7/2001 | DiLorenzo | | |

(Continued)

FOREIGN PATENT DOCUMENTS

| | | |
|---|---|---|
| EP | 0507964 A1 | 10/1992 |
| EP | 1389853 A1 | 2/2004 |

(Continued)

OTHER PUBLICATIONS

AudioTron Quick Start Guide, Version 1.0, Mar. 2001, 24 pages.

(Continued)

*Primary Examiner* — Daniel R Sellers

(57) ABSTRACT

An example playback device is configured to receive a first volume command to adjust a volume level of audio playback by the playback device in a first direction. Based on the first volume command, the playback device causes the volume level of the audio playback to be adjusted in the first direction by a first increment. The playback device is further configured to receive a second volume command to adjust the volume level in a second direction and determine that the second volume command was received within a threshold period of time after receiving the first volume command. Based on (i) determining that the second volume command was received within the threshold period of time and (ii) the second volume command, the playback device causes the (Continued)

volume level of the audio playback to be adjusted in the second direction by a second increment that is different from the first increment.

20 Claims, 13 Drawing Sheets

(56) References Cited

U.S. PATENT DOCUMENTS

| | | | | |
|---|---|---|---|---|
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2006/0050899 | A1* | 3/2006 | Hsieh | H03G 3/04 381/104 |
| 2007/0142944 | A1 | 6/2007 | Goldberg et al. | |
| 2018/0136897 | A1* | 5/2018 | Rossbacher | H03G 3/00 |
| 2020/0076388 | A1* | 3/2020 | Charlton | H04N 21/43615 |
| 2022/0286795 | A1 | 9/2022 | Lewis et al. | |

FOREIGN PATENT DOCUMENTS

| | | | |
|---|---|---|---|
| WO | 200153994 | | 7/2001 |
| WO | 2003093950 | A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Jan. 5, 2024, issued in connection with International Application No. PCT/US2023/075289, filed on Sep. 27, 2023, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

DYNAMIC VOLUME CONTROL

CROSS-REFERENCE TO RELATED APPLICATIONS

This application claims priority to U.S. Provisional Application No. 63/412,009, filed Sep. 30, 2022, and titled "Dynamic Volume Control," the contents of which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
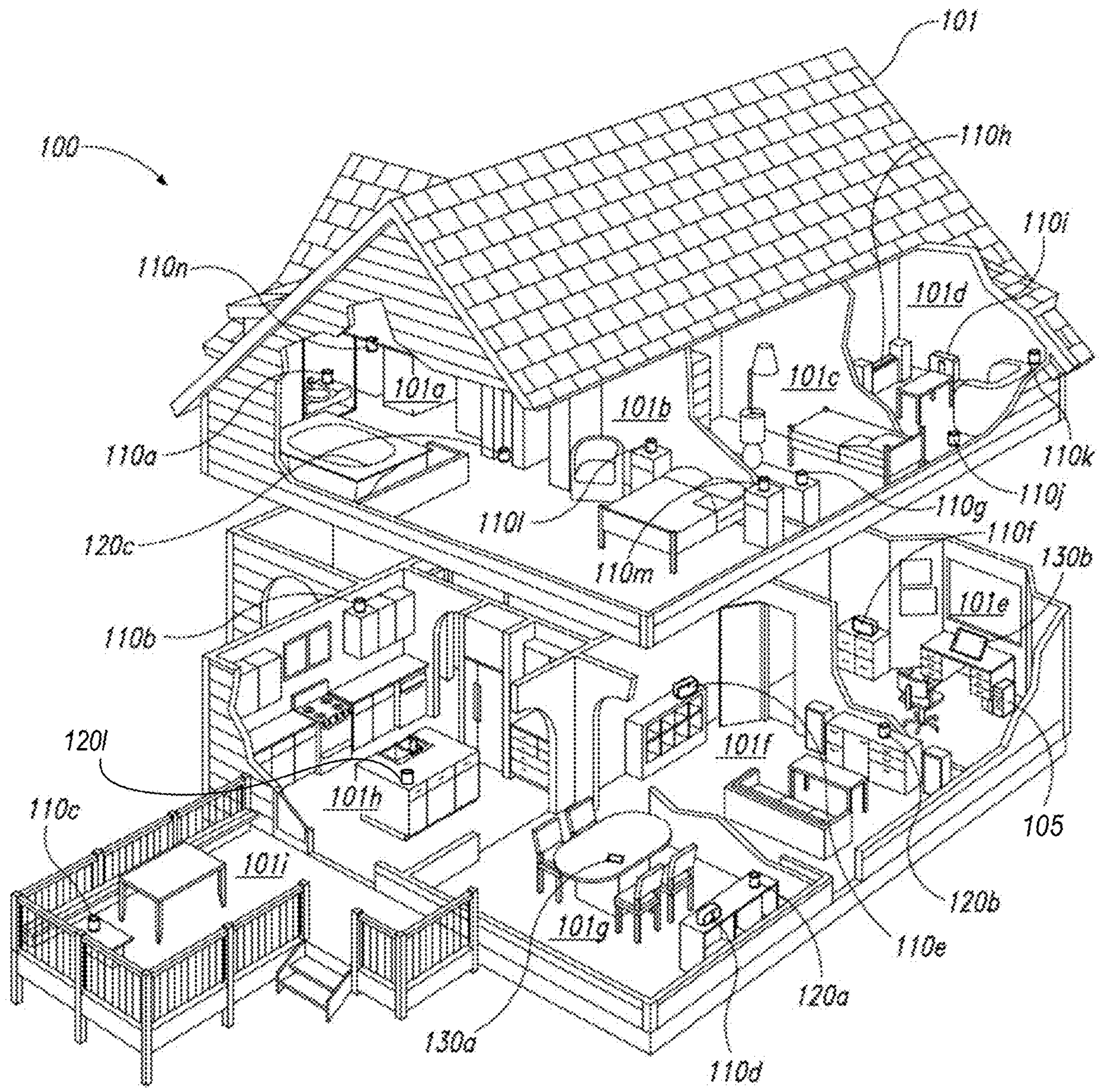
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS, Inc. has been a consistent innovator in the space of playback control for multiple decades and, through this innovation, has developed a number of improved techniques for controlling the volume of media playback. Some examples of such innovation include techniques for adjusting the volume of playback devices in a synchronous playback group individually or collectively, as disclosed in U.S. Pat. No. 8,234,395 (issued on Jul. 31, 2012), U.S. Pat. No. 7,571,014 (issued on Aug. 4, 2009), and U.S. Pat. No. 9,202,509 (issued on Dec. 1, 2015). Another example includes improved user interfaces of a control device for allowing users to adjust playback volume quickly and intuitively, as disclosed in U.S. Pat. No. 9,654,073 (issued on May 16, 2017). Yet another example includes techniques for adjusting the volume of playback devices in a synchronous playback group based on an input received at a secondary (or satellite) playback device in the playback group instead of at a primary playback device configured to control various aspects of media playback by the group, as disclosed in U.S. Pat. No. 9,438,193 (issued on Sep. 6, 2016).

Further, another example includes techniques for storing volume settings for playback devices before they are grouped (or ungrouped) and then reverting the playback devices to their respective previous volume settings when they are subsequently ungrouped (or grouped), as disclosed in U.S. Pat. No. 9,231,545 (issued on Jan. 5, 2016). Further yet, another example includes improved user interfaces for adjusting the volume of playback devices in a synchronous playback group that provide indications of both group volume and individual playback device volumes, as disclosed in U.S. Pat. No. 10,599,287 (issued on Mar. 24, 2020). Further still, another example includes techniques for limiting the volume of a playback device in various use cases to avoid startling a user with excessively loud volumes when initiating playback, as disclosed in U.S. Pat. No. 9,678,708 (issued on Jun. 14, 2017). Another example includes techniques for reducing the volume of bass content to protect playback devices from hitting operational limits, but doing so in an intelligent manner that accounts for volume reductions using both upstream dynamic bass control and a downstream limiter, as disclosed in U.S. Pat. No. 10,862,446 (issued on Dec. 8, 2020). Yet another example includes techniques for limiting a playback device's maximum volume setting, as well as user interfaces for displaying altered volume controls that limit the available volume adjustments based on the maximum volume setting, as disclosed in U.S. Pat. No. 10,461,710 (issued Oct. 29, 2019).

Expanding on this history of playback control innovation, the embodiments described herein relate to techniques for dynamically varying the magnitude of a volume adjustment based on the manner of the user input that prompted the adjustment. Such dynamic volume adjustment may result in a playback volume that more accurately reflects the user's intention when providing a volume control input.

For context, consider that playback devices can be configured to apply volume adjustments in increments of predefined amounts. For instance, a playback device may have a volume range that extends from a minimum volume to a maximum volume, and this range may be divided into a number of discrete volume settings. At the finest level of granularity, the playback device may adjust its volume by increasing or decreasing the volume by a single one of these discrete volume settings. In some circumstances, however, such as when the difference between adjacent discrete volume settings is small (e.g., small enough that the difference is difficult to discern by a listener), the listener may wish to increase or decrease the volume at a coarser level of granularity by increasing or decreasing the volume by multiple ones of the discrete volume settings. One such circumstance may arise when adjusting playback volume using voice commands, as issuing a separate voice command for each incremental change in discrete volume settings can quickly become tedious when doing so at the finest level of granularity. As such, the playback device may instead be configured to use a coarser granularity when adjusting volume based on a voice command. These coarser adjustments may also be invoked in response to other types of inputs as well, such as discrete button presses or the like.

When applying a coarser volume adjustment, however, there may still be circumstances where the granularity of the volume adjustment does not suit the desires of the listener. For instance, in some circumstances, the granularity may be too coarse. As an example, a listener may provide a first input requesting an increase in volume, and the playback device may responsively increase its volume at such a coarse granularity that the new volume exceeds the listener's desired volume. The listener may then subsequently provide a second input requesting a decrease in volume, and the playback device may responsively decrease its volume using the coarse granularity back to the original volume that the listener found too quiet. In other circumstances, the granularity may be too fine. As an example, a listener may provide a first input requesting an increase in volume, and the playback device may responsively increase its volume at such a fine granularity that the new volume is still below the listener's desired volume. The listener may then subsequently provide a number of further inputs requesting an increase in volume until the playback device finally reaches a volume suitable to the listener.

To address these and other issues, techniques are discussed below that may allow for dynamically adjusting the coarseness of a volume adjustment of a playback device. For example, in line with the discussion above, when a playback device receives multiple consecutive commands to change the volume in a short period of time, the playback device may infer that the coarseness of the incremental volume adjustment should be changed, and the playback device may take action to make such a change. In some examples, such as when the multiple consecutive commands include a first command to increase the volume followed by a second command to reduce the volume, this may involve reducing the coarseness for the volume adjustment corresponding to the second command. In other examples, such as when the multiple consecutive commands include a first command to increase the volume followed by a second command to further increase the volume, this may involve increasing the coarseness for the volume adjustment corresponding to the second command. Still other examples are contemplated herein as well.

Accordingly, in some embodiments, for example, a playback device is provided including a network interface, at least one processor, a non-transitory computer-readable medium, and program instructions stored on the non-transitory computer-readable medium that are executable by the at least one processor such that the playback device is configured to (i) receive a first volume command to adjust a volume level of audio playback by the playback device in a first direction, (ii) based on the first volume command, cause the volume level of the audio playback to be adjusted in the first direction by a first increment, (iii) receive a second volume command to adjust the volume level in a second direction, (iv) determine that the second volume command was received within a threshold period of time after receiving the first volume command, and (v) based on (a) determining that the second volume command was received within the threshold period of time and (b) the second volume command, cause the volume level of the audio playback to be adjusted in the second direction by a second increment that is different from the first increment.

In another aspect, a non-transitory computer-readable medium in provided. The non-transitory computer-readable medium is provisioned with program instructions that, when executed by at least one processor, cause a playback device to (i) receive a first volume command to adjust a volume level of audio playback by the playback device in a first direction, (ii) based on the first volume command, cause the volume level of the audio playback to be adjusted in the first direction by a first increment, (iii) receive a second volume command to adjust the volume level in a second direction, (iv) determine that the second volume command was received within a threshold period of time after receiving the first volume command, and (v) based on (a) determining that the second volume command was received within the threshold period of time and (b) the second volume command, cause the volume level of the audio playback to be adjusted in the second direction by a second increment that is different from the first increment.

In yet another aspect, a method carried out by a playback device includes, (i) receiving a first volume command to adjust a volume level of audio playback by the playback device in a first direction, (ii) based on the first volume command, causing the volume level of the audio playback to be adjusted in the first direction by a first increment, (iii) receiving a second volume command to adjust the volume level in a second direction, (iv) determining that the second volume command was received within a threshold period of time after receiving the first volume command, and (v) based on (a) determining that the second volume command was received within the threshold period of time and (b) the second volume command, causing the volume level of the audio playback to be adjusted in the second direction by a second increment that is different from the first increment.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the figures, identical reference numbers identify generally similar, and/or identical, elements. To facilitate the discussion of any particular element, the most significant digit or digits of a reference number refers to the figure in which that element is first introduced. For example, element 110*a* is first introduced and discussed with reference to FIG. 1A. Many of the details, dimensions, angles and other features shown in the figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment a. Suitable Media Playback System

Figure 1B:
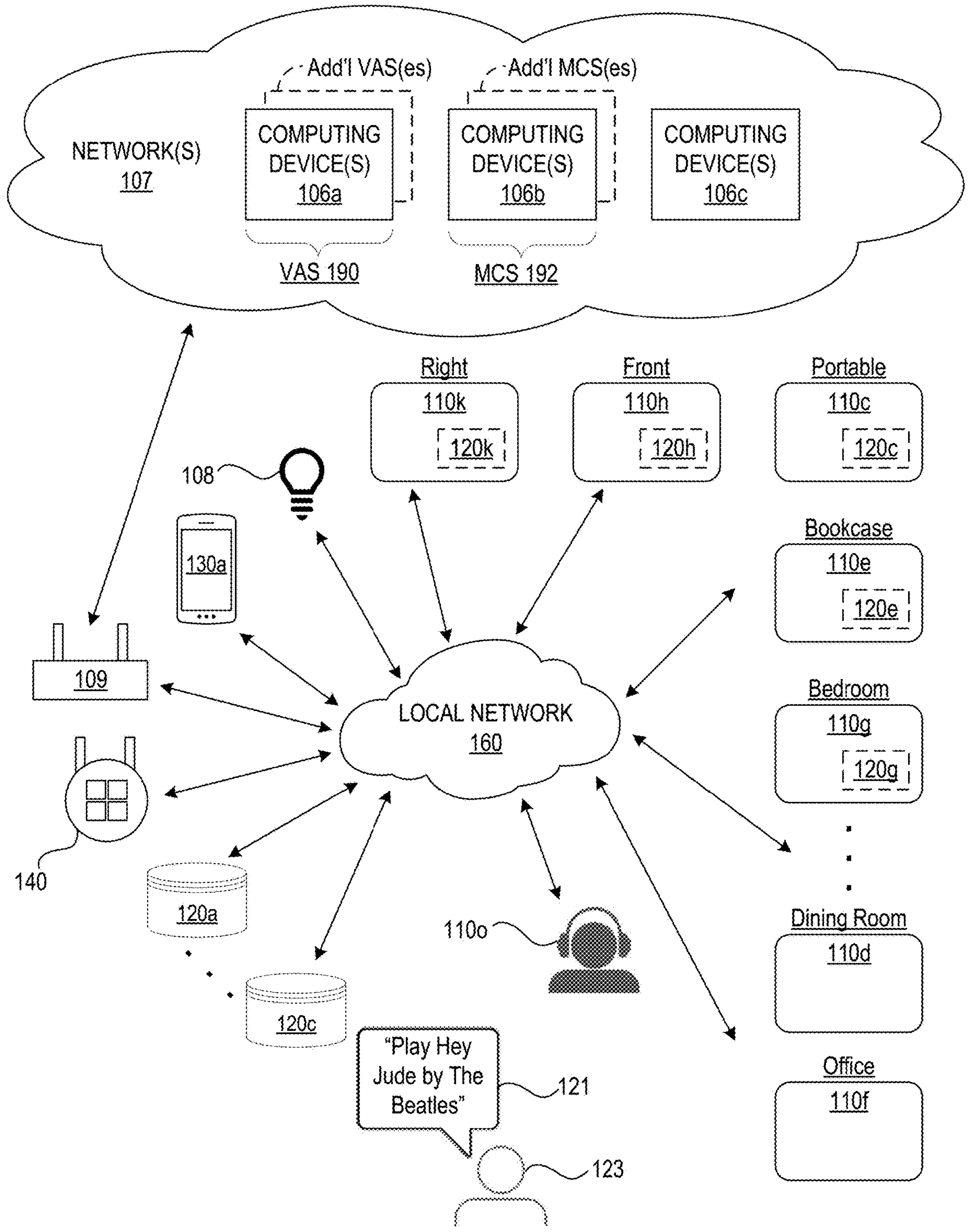
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110*a-o*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110*a*) in synchrony with a second playback device (e.g., the playback device 110*b*). Interactions between the playback devices 110, NMDs 120, and/or control devices 130 of the MPS 100 configured in accordance with the various embodiments of the disclosure are described in greater detail below with respect to FIGS. 1B-1N.

In the illustrated embodiment of FIG. 1A, the environment 101 comprises a household having several rooms, spaces, and/or playback zones, including (clockwise from upper left) a Master Bathroom 101*a*, a Master Bedroom 101*b*, a Second Bedroom 101*c*, a Family Room or Den 101*d*, an Office 101*e*, a Living Room 101*f*, a Dining Room 101*g*, a Kitchen 101*h*, and an outdoor Patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101*e*, Master Bathroom 101*a*, Master Bedroom 101*b*, the Second Bedroom 101*c*, Kitchen 101*h*, Dining Room 101*g*, Living Room 101*f*, and/or the Patio 101*i*. In some aspects, a single playback zone may include multiple rooms or spaces. In certain aspects, a single room or space may include multiple playback zones.

In the illustrated embodiment of FIG. 1A, the Master Bathroom 101*a*, the Second Bedroom 101*c*, the Office 101*e*, the Living Room 101*f*, the Dining Room 101*g*, the Kitchen 101*h*, and the outdoor Patio 101*i* each include one playback device 110, and the Master Bedroom 101*b* and the Den 101*d* include a plurality of playback devices 110. In the Master Bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the Den 101*d*, the playback devices 110*h-j* can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140 (FIG. 1B), and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphone device 1100 (FIG. 1B) may be a portable playback device, while the playback device 110*e* on the bookcase may be a stationary device. As another example, the playback device 110*c* on the Patio 101*i* may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110*j* in the Den 101*d* (FIG. 1A), which may be designated as the "Left" device, may have a point-to-point connection with the playback device 110*k*, which is also in the Den 101*d* and may be designated as the "Right" device. In a related embodiment, the Left playback device 110*j* may communicate with other network devices, such as the playback device 110*h*, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106*a* may comprise one or more modules and/or servers of a VAS. In some implementations, VASes may be operated by one or more of SONOS @, AMAZON®, GOOGLE® APPLE®, MICROSOFT®, NUANCE®, or other voice assistant providers. In some implementations, MCSes may be operated by one or more of SPOTIFY®, PANDORA®, AMAZON MUSIC®, YOUTUBE MUSIC, APPLE MUSIC®, GOOGLE PLAY®, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device(s) 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 110 may take the form of or include an on-board (e.g., integrated) network microphone device configured to detect sound, including voice utterances from a user. For example, the playback devices 110*c*-110*h*, and 110*k* include or are otherwise equipped with corresponding NMDs 120*c*-120*h*, and 120*k*, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120*l* (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110*e* because it is physically situated on a bookcase. Similarly, the NMD 120*l* may be assigned the named "Island" because it is physically situated on an island countertop in the Kitchen 101*h* (FIG. 1A). Some playback devices may be assigned names according to a zone or room, such as the playback devices 110*g*, 110*d*, and 110*f*, which are named "Bedroom," "Dining Room," and "Office," respectively. Further, certain playback devices may have functionally descriptive names. For example, the playback devices 110*k* and 110*h* are assigned the names "Right" and "Front," respectively, because these two devices are configured to provide specific audio channels during media playback in the zone of the Den 101*d* (FIG. 1A). The playback device 110*c* in the Patio 101*i* may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Pat. No. 10,499,146, issued Nov. 13, 2019 and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude" performed by The Beatles. After these determinations, the VAS 190 may transmit a command to a particular MCS 192 to retrieve content (i.e., the song "Hey Jude" by The Beatles), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110*e* in the environment 101 (FIG. 1A) is in relatively close proximity to the NMD-equipped Living Room playback device 120*b*, and both devices 110*e* and 120*b* may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 120*l* in the Kitchen 101*h* (FIG. 1A) may be assigned to the Dining Room playback device 110*d*, which is in relatively close proximity to the Island NMD 120*l*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106*a-c*. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
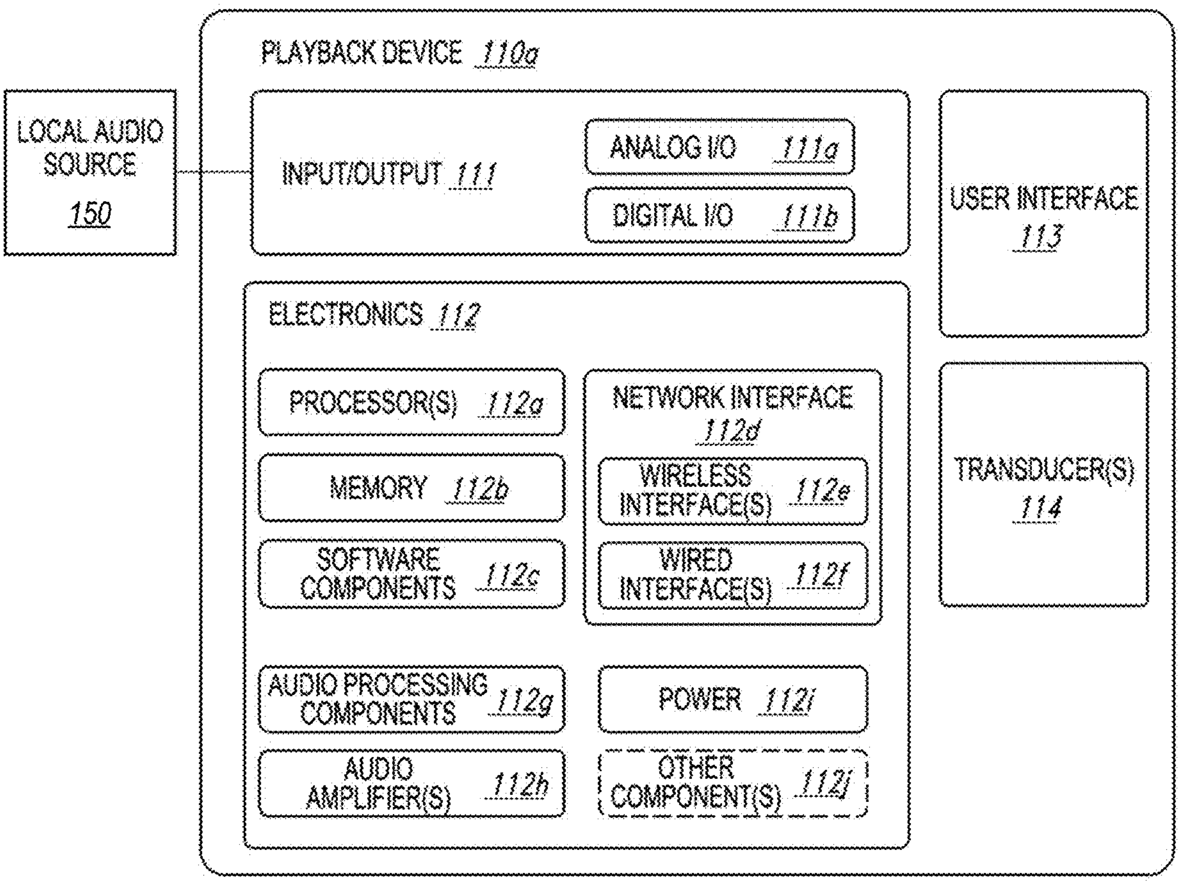
FIG. 1C is a block diagram of an example playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WIFI, BLUETOOTH, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110*a* does not include an input/output 111 and receives all audio content via the local network 160.

The playback device 110*a* further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106*a-c* via the local network 160 (FIG. 1B), amplify the received audio, and output the amplified audio for playback via one or more of the transducers 114. In some embodiments, the playback device 110*a* optionally includes one or more microphones (e.g., a single microphone, a plurality of microphones, a microphone array) (hereinafter referred to as "the microphones"). In certain embodiments, for example, the playback device 110*a* having one or more of the optional microphones can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g*, one or more audio amplifiers 112*h* (referred to hereinafter as "the amplifiers 112*h*"), and power components 112*i* (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112*j* (e.g., one or more sensors, video displays, touchscreens, battery charging bases). In some embodiments, the playback device 110*a* and electronics 112 may further include one or more voice processing components that are operably coupled to one or more microphones, and other components as described below with reference to FIGS. 1F and 1G.

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," which is herein incorporated by reference in its entirety.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

Figure 1D:
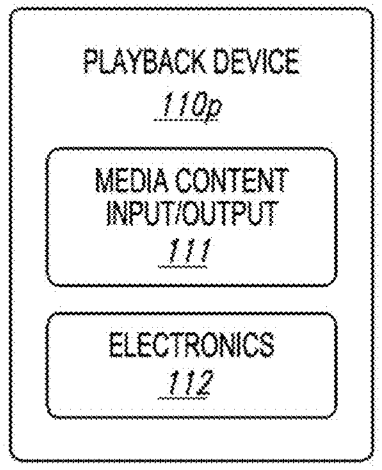
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "SUB," "BEAM," "ARC," "MOVE," "ERA," and "ROAM," among others. Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more of the playback devices 110 may comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110*p* comprising the input/output 111 and electronics 112 without the user interface 113 or transducers 114.

Figure 1E:
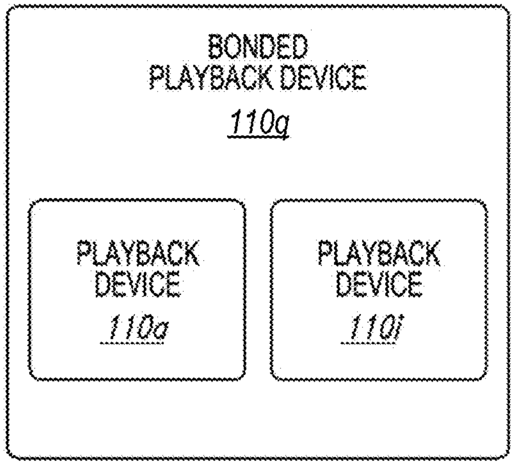
FIG. 1E is a block diagram of an example playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figure 2:
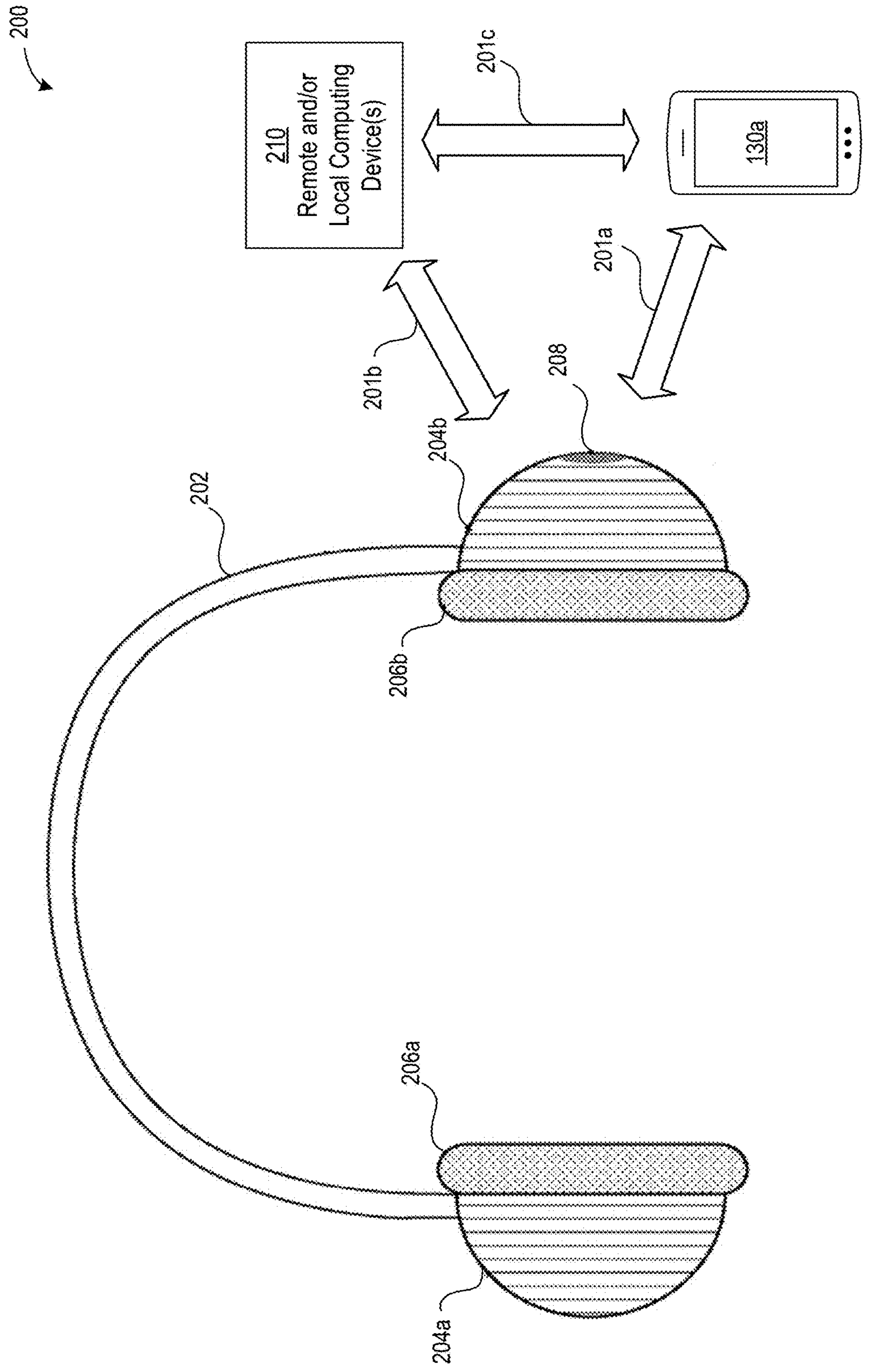
FIG. 2 is a diagram of an example headset assembly for an example playback device.

In some embodiments, one or more of the playback devices 110 may take the form of a wired and/or wireless headphone device (e.g., over-ear headphones, on-ear headphones, in-ear earphones, etc.). For instance, FIG. 2 shows an example headset assembly 200 ("headset 200") for such an implementation of one of the playback devices 110. As shown, the headset 200 includes a headband 202 that couples a first earcup 204*a* to a second earcup 204*b*. Each of the earcups 204*a* and 204*b* may house any portion of the electronic components in the playback device 110, such as one or more speakers. Further, one or both of the earcups 204*a* and 204*b* may include a user interface for controlling audio playback, volume level, and other functions. The user interface may include any of a variety of control elements such as a physical button 208, a slider (not shown), a knob (not shown), and/or a touch control surface (not shown). As shown in FIG. 2, the headset 200 may further include ear cushions 206*a* and 206*b* that are coupled to earcups 204*a* and 204*b*, respectively. The ear cushions 206*a* and 206*b* may provide a soft barrier between the head of a user and the earcups 204*a* and 204*b*, respectively, to improve user comfort and/or provide acoustic isolation from the ambient (e.g., passive noise reduction (PNR)).

As described in greater detail below, the electronic components of a playback device may include one or more network interface components (not shown in FIG. 2) to facilitate wireless communication over one more communication links. For instance, a playback device may communicate over a first communication link 201*a* (e.g., a BLUETOOTH link) with one of the control devices 130, such as the control device 130*a*, and/or over a second communication link 201*b* (e.g., a WIFI or cellular link) with one or more other computing devices 210 (e.g., a network router and/or a remote server). As another possibility, a playback device may communicate over multiple communication links, such as the first communication link 201*a* with the control device 130*a* and a third communication link 201*c* (e.g., a WIFI or cellular link) between the control device 130*a* and the one or more other computing devices 210. Thus, the control device 130*a* may function as an intermediary between the playback device and the one or more other computing devices 210, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMDs)

Figure 1F:
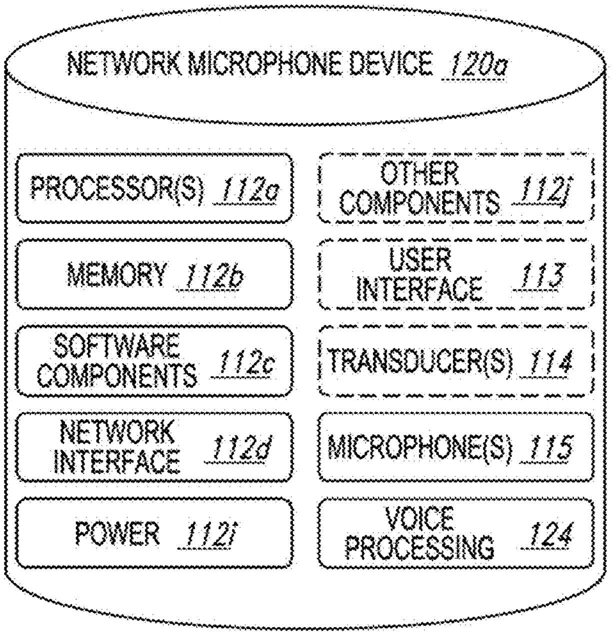
FIG. 1F is a block diagram of an example network microphone device.

FIG. 1F is a block diagram of the NMD 120*a* (FIGS. 1A and 1B). The NMD 120*a* includes one or more voice processing components 124 and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1C. In some aspects, for example, the NMD 120*a* includes the processor 112*a* and the memory 112*b* (FIG. 1C), while omitting one or more other components of the electronics 112. In some embodiments, the NMD 120*a* includes additional components (e.g., one or more sensors, cameras, thermometers, barometers, hygrometers).

Figure 1G:
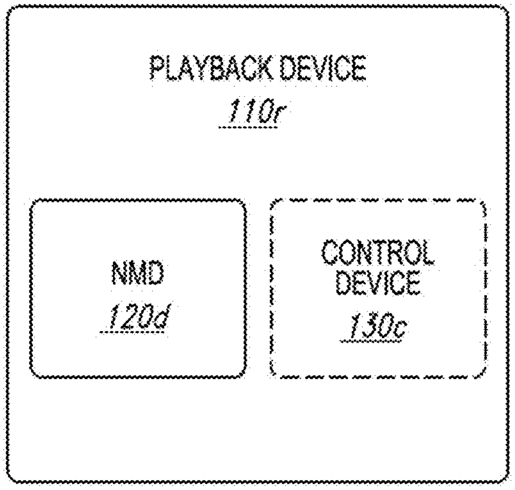
FIG. 1G is a block diagram of an example playback device.

In some embodiments, an NMD can be integrated into a playback device. FIG. 1G is a block diagram of a playback device 110*r* comprising an NMD 120*d*. The playback device 110*r* can comprise any or all of the components of the playback device 110*a* and further include the microphones 115 and voice processing components 124 (FIG. 1F). The microphones 115 are configured to detect sound (i.e., acoustic waves) in the environment of the playback device 110*r*, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110*r* may include fewer than six microphones or more than six microphones. The playback device 110*r* optionally includes an integrated control device 130*c*. The control device 130*c* can comprise, for example, a user interface configured to receive user input (e.g., touch input, voice input) without a separate control device. In other embodiments, however, the playback device 110*r* receives commands from another control device (e.g., the control device 130*a* of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112*a*.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The NMD 120*a* may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
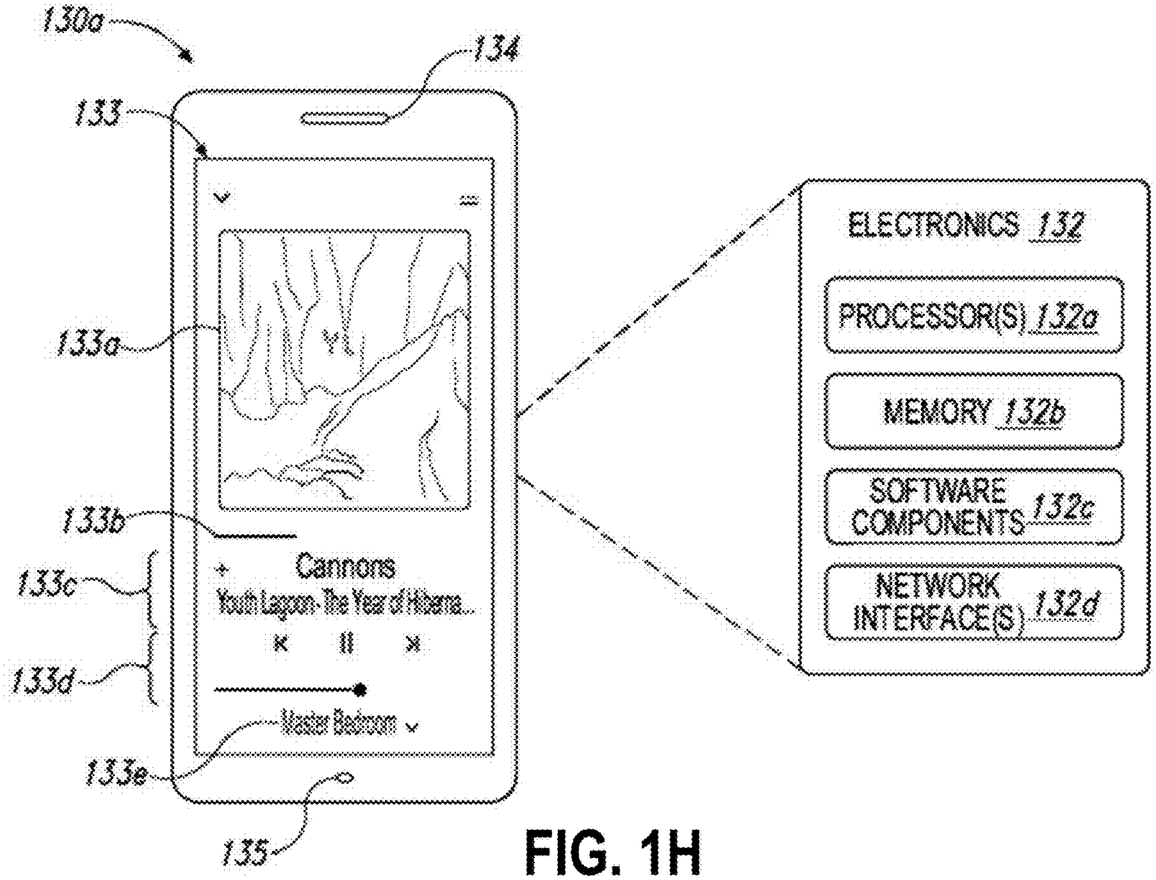
FIG. 1H is a partially schematic diagram of an example control device.

FIG. 1H is a partially schematic diagram of one example of the control device 130*a* (FIGS. 1A and 1B). As used herein, the term "control device" can be used interchangeably with "controller," "controller device," or "control system." Among other features, the control device 130*a* is configured to receive user input related to the MPS 100 and, in response, cause one or more devices in the MPS 100 to perform an action(s) and/or an operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the MPS 100. In other embodiments, as described above with respect to FIG. 1G, the control device 130*a* is integrated into another device in the MPS 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processor(s) 132*a*"), a memory 132*b*, software components 132*c*, and a network interface 132*d*. The processor(s) 132*a* can be configured to perform functions relevant to facilitating user access, control, and configuration of the MPS 100. The memory 132*b* can comprise data storage that can be loaded with one or more of the software components executable by the processors 132*a* to perform those functions. The software components 132*c* can comprise applications and/or other executable software configured to facilitate control of the MPS 100. The memory 132*b* can be configured to store, for example, the software components 132*c*, media playback system controller application software, and/or other data associated with the MPS 100 and the user.

The network interface 132*d* is configured to facilitate network communications between the control device 130*a* and one or more other devices in the MPS 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 1N.

Figure 1I:
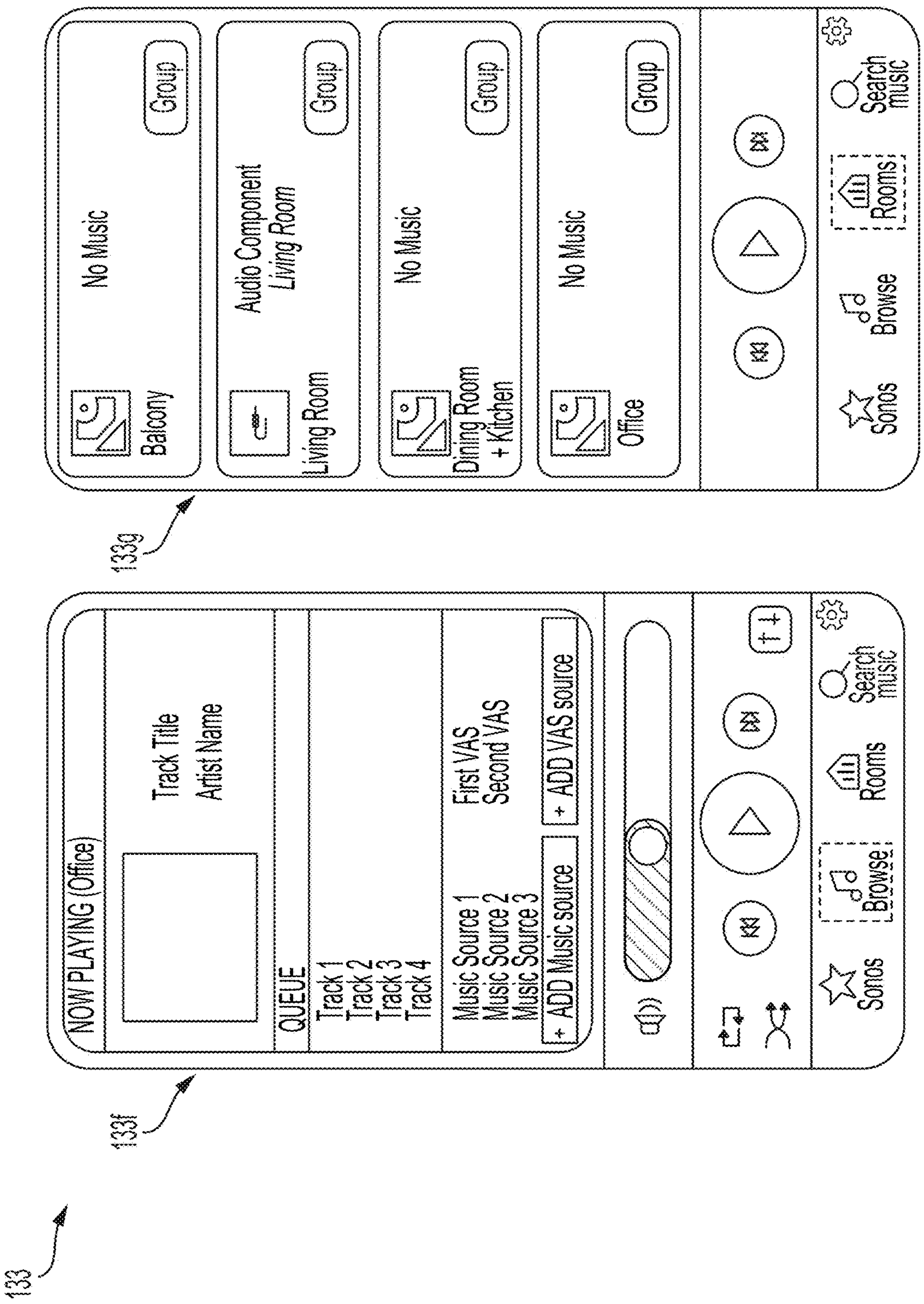
FIG. 1I is a schematic diagram of example user interfaces of the example control device of FIG. 1H.

The user interface 133 is configured to receive user input and can facilitate control of the MPS 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133*f* and 133*g* of user interface 133. Additional examples are also possible.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1J:
FIGS. 1J through 1M are schematic diagrams of example corresponding media playback system zones.
Figure 1K:
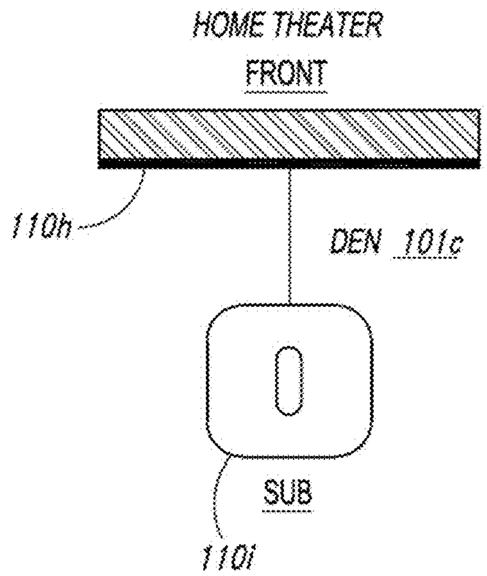
Figure 1L:
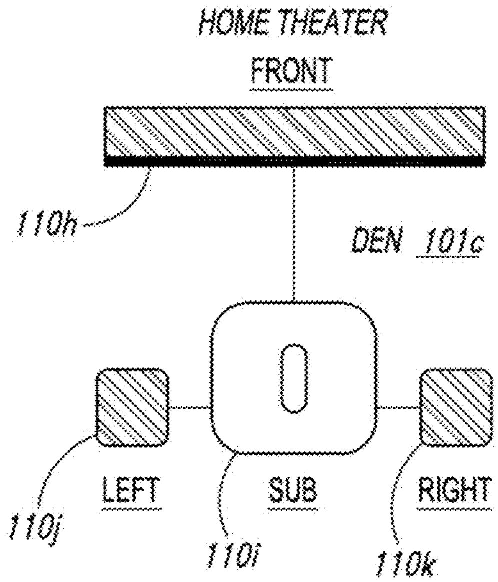
Figure 1M:
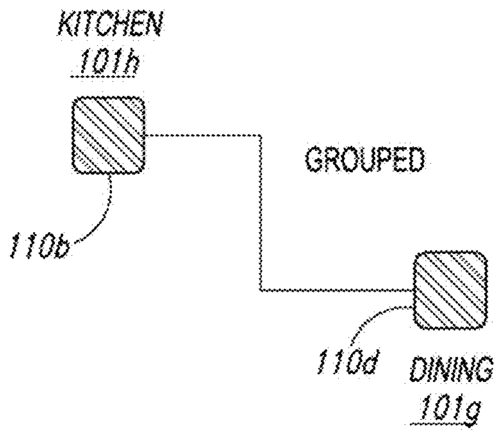
Figure 1N:
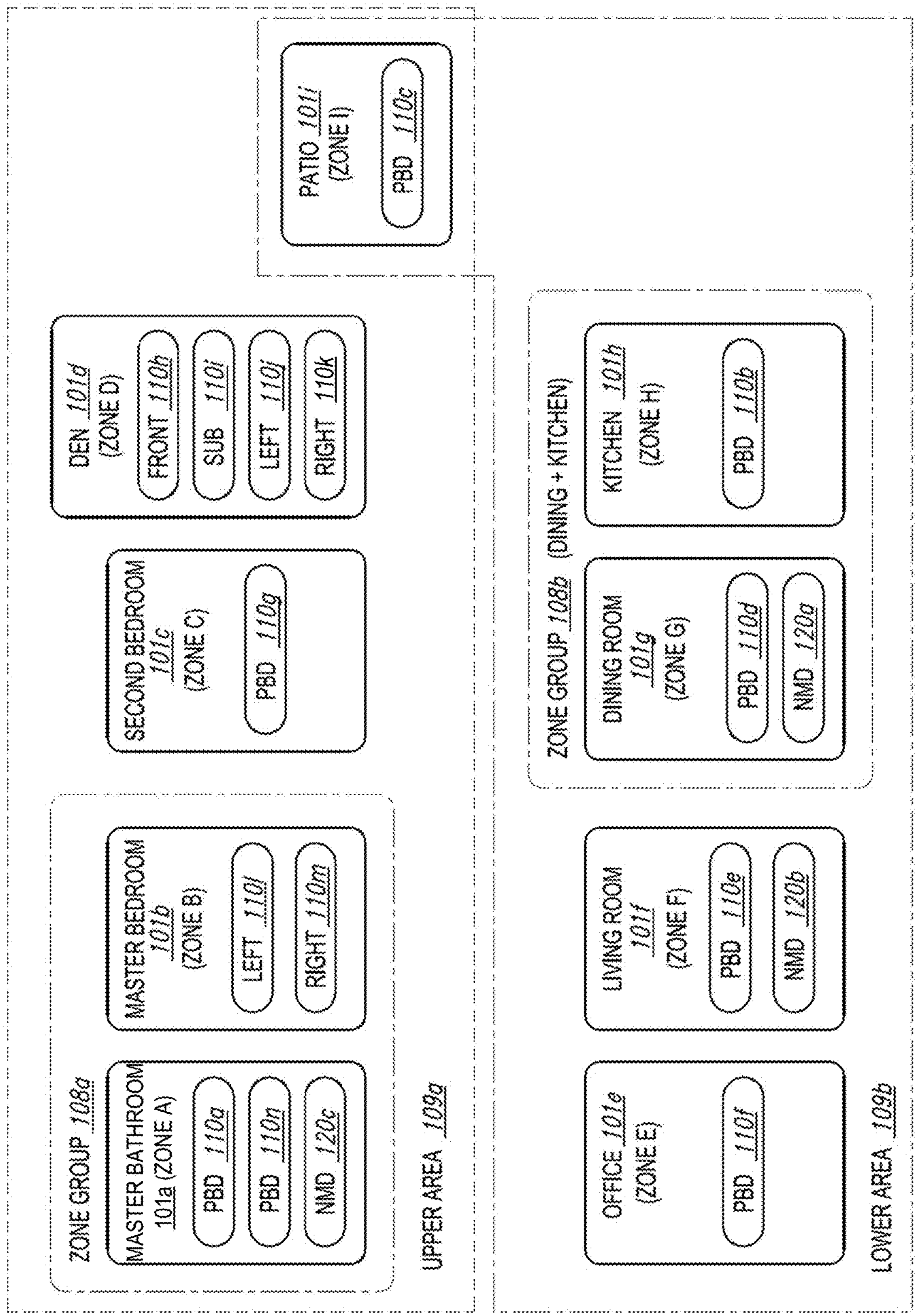
FIG. 1N is a schematic diagram of example media playback system areas.

FIGS. 1J, 1K, 1L, 1M, and 1N show example configurations of playback devices in zones and zone groups. Referring first to FIG. 1N, in one example, a single playback device may belong to a zone. For example, the playback device 110*g* in the Second Bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*m* (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110*a* can be bonded to the playback device 110*n* and the NMD 120*c* to form Zone A. As another example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108*a*. As another example, the playback zones Zone G and Zone H can be merged to form Zone Group 108*b*. The merged playback zones Zone G and Zone H may not be specifically assigned different playback responsibilities. That is, the merged playback zones Zone G and Zone H may, aside from playing audio content in synchrony, each play audio content as they would if they were not merged and operating as independent zones.

Each zone in the MPS 100 may be represented for control as a single user interface (UI) entity. For example, Zone A may be represented as a single entity named Master Bathroom. Zone B may be represented as a single entity named Master Bedroom. Zone C may be represented as a single entity named Second Bedroom.

In some implementations, as mentioned above playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB playback device 110*i* can be configured to render low frequencies. When unbonded, however, the Front device 110*h* can be configured to render a full range of frequencies. As another example, FIG. 1L shows the Front and SUB playback devices 110*h* and 110*i* further bonded with Left and Right playback devices 110*j* and 110*k*, respectively. In some implementations, the Right and Left devices 110*j* and 110*k* can be configured to form surround or "satellite" channels of a home theater system. The bonded playback devices 110*h*, 110*i*, 110*j*, and 110*k* may form a single Zone D (FIG. 1N).

In other implementations, playback devices that are merged may not have assigned playback responsibilities and may each render the full range of audio content of which the respective playback device is capable. Nevertheless, merged devices may be represented as a single UI entity (i.e., a zone, as discussed above). For instance, the playback devices 110*a* and 110*n* in the Master Bathroom have the single UI entity of Zone A. In one embodiment, the playback devices 110*a* and 110*n* may each output the full range of audio content of which each respective playback devices 110*a* and 110*n* is capable, in synchrony.

In some embodiments, an NMD may be bonded or merged with one or more other devices so as to form a zone. As one example, the NMD 120*c* may be merged with the playback devices 110*a* and 110*n* to form Zone A. As another example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108*a* that includes the two zones, and Zone G may be grouped with Zone H to form the zone group 108*b*. However, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zone groups in an environment may be named by according to a name of a zone within the group or a combination of the names of the zones within a zone group. For example, Zone Group 108*b* can be assigned a name such as "Dining+Kitchen", as shown in FIG. 1N. In other implementations, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "al" to identify playback device(s) of a zone, a second type "b 1" to identify playback device(s) that may be bonded in the zone, and a third type "cl" to identify a zone group to which the zone may belong. As a related example, identifiers associated with the Second Bedroom 101*c* may indicate (i) that the playback device 110*g* is the only playback device of the Zone C and (ii) that Zone C is not in a zone group. Identifiers associated with the Den 101*d* may indicate that the Den 101*d* is not grouped with other zones but includes bonded playback devices 110*h*-110*k*. Identifiers associated with the Dining Room 101*g* may indicate that the Dining Room 101*g* is part of the Dining+Kitchen Zone Group 108*b* and that devices 110*d* and 110*b* (Kitchen 101*h*) are grouped (FIGS. 1M, 1N). Identifiers associated with the Kitchen 101*h* may indicate the same or similar information by virtue of the Kitchen 101*h* being part of the Dining+Kitchen Zone Group 108*b*. Other example zone variables and identifiers are described below.

In yet another example, the MPS 100 may include variables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
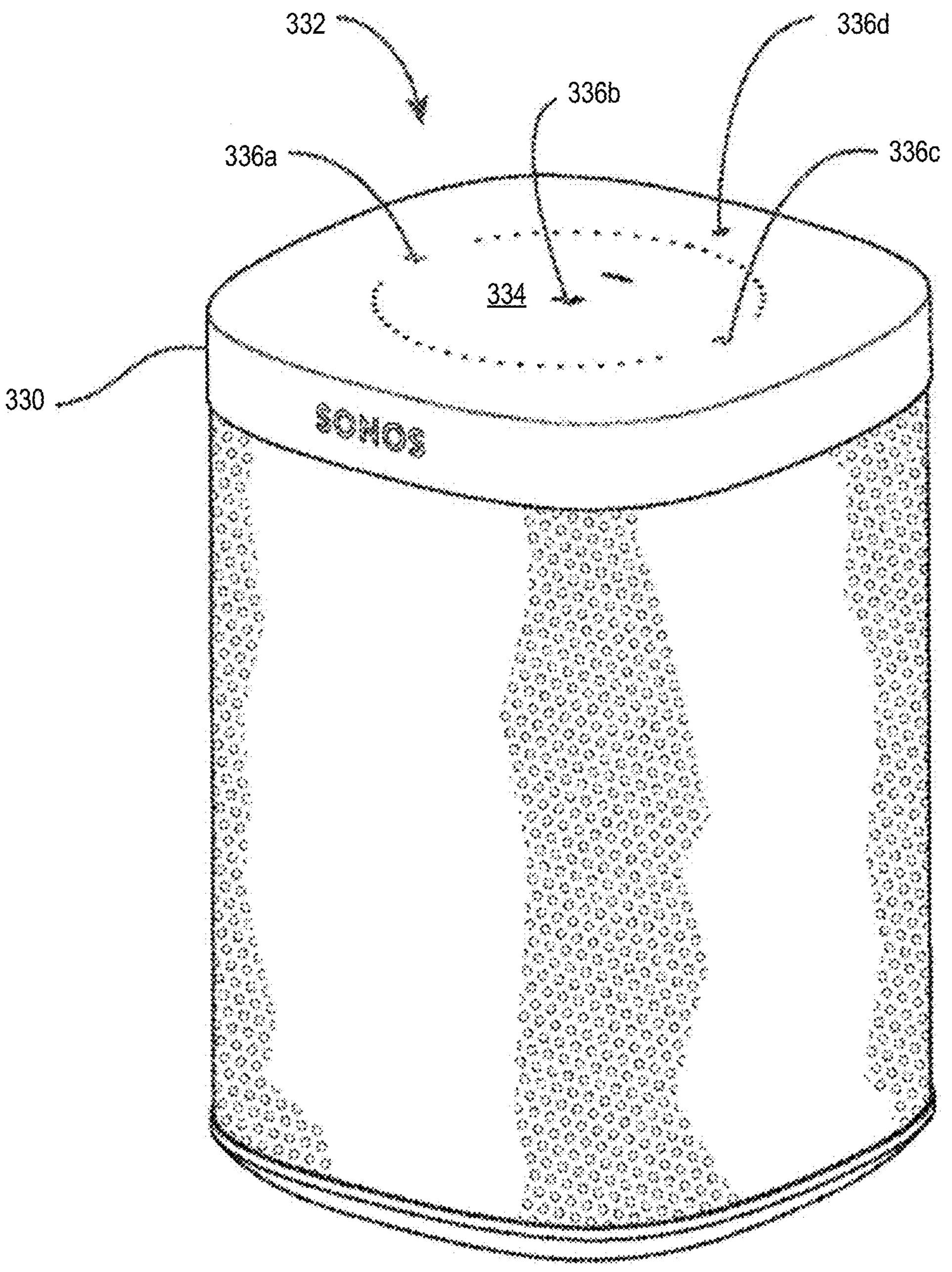
FIG. 3 is an isometric diagram of an example playback device housing.

FIG. 3 shows an example housing 330 of a playback device (e.g., one of the playback devices 110 discussed above) that includes a user interface in the form of a control area 332 at a top portion 334 of the housing 330. The control area 332 includes buttons 336*a*, 336*b*, and 336*c* for controlling audio playback, volume level, and other functions. The control area 332 also includes a button 336*d* for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device. The microphones may be arranged in various positions along and/or within the top portion 334 or other areas of the housing 330 so as to detect sound from one or more directions relative to the playback device.

e. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices may be referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

III. Example Techniques for Providing Dynamic Volume Increments

As discussed above, a playback device can be configured to apply volume adjustments in increments of predefined amounts, and there can be circumstances where the predefined increments are coarser or finer than the desires of a listener. For instance, in some examples, the predefined increment may be too coarse, such that the volume adjustment overshoots the desired volume, and the listener has to choose between audio playback that is either too loud or too quiet. In other examples, the predefined increment may be too fine, such that the listener has to provide multiple volume adjustment commands to arrive at the desired volume. Thus, techniques for dynamically setting the coarseness of volume adjustment increments in a manner that helps address these issues can lead to an improved user experience.

Figure 4:
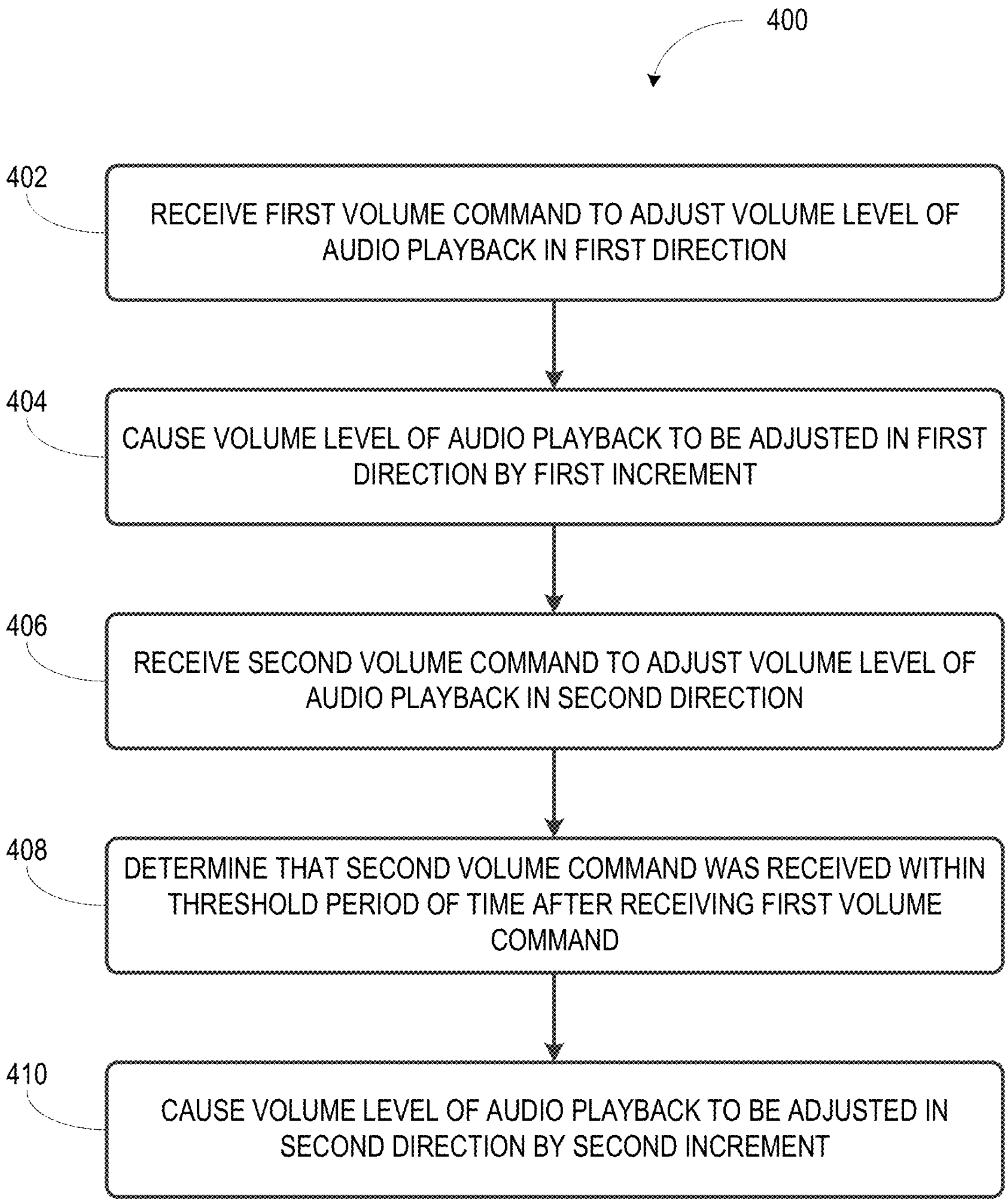
FIG. 4 is a flowchart showing example operations for applying dynamic volume increments when adjusting the volume of a playback device.

FIG. 4 is a flowchart 400 that illustrates one example implementation for dynamically setting the coarseness of volume adjustment increments of a playback device. The playback device may be, for example, any of the playback devices 110 discussed above and shown in FIGS. 1A-3, which may include the portable, battery-powered playback device 110*c* or the wearable playback device (e.g., headphone device) 1100.

Beginning at block 402, the playback device 110 receives a first volume command to adjust a volume level of audio playback by the playback device 110 in a first direction. The first direction corresponds to either a volume increase (i.e., in the "volume up" direction) or a volume decrease (i.e., in the "volume down" direction).

The playback device 110 can receive the first volume command in any of various manners, which are described above in further detail. As one example, the playback device 110 can receive the first volume command as a voice command via one or more microphones of the playback device 110 or another network microphone device (e.g., any of NMDs 120 discussed above) in communication with the playback device 110. For instance, a user may utter a wake word followed by a command to "increase volume" or "decrease volume." As another example, the playback device 110 can receive the first volume command as a tactile input, such as a button press, touch input, or similar interaction received via the user interface 113 of the playback device 110. As yet another example, the playback device 110 can receive the first volume command from a controller (e.g., any of the control devices 130 depicted in FIGS. 1A, 1B, and 1G-1I) based on user input provided via a user interface of the controller. Other examples are also possible.

At block 404, based on the detected input, the playback device 110 causes the volume level of the audio playback to be adjusted in the first direction by a first increment. In line with the discussion above, the playback device 110 can have a volume range that extends from a minimum volume to a maximum volume, and this range can be divided into a number of discrete volume settings. As one example, the minimum volume setting of the playback device 110 can be assigned a value of 0, the maximum volume setting of the playback device 110 can be assigned a value of 100, and each discrete volume setting between the minimum and maximum volumes can be assigned an integer value between 0 and 100. In such an arrangement, each volume setting can correspond to a particular gain setting of an amplifier of the playback device 110, a particular decibel value, or a percentage or fractional value of the gain setting or decibel value. Other example arrangements are possible as well.

When adjusting the volume level of the audio playback at block 404, the playback device 110 can adjust the volume level by changing the volume setting in the first direction by the first increment, and the playback device 110 can do so in various ways. In some examples, the playback device can apply an offset value to a current volume setting, where the offset value corresponds to the first increment. For instance, if the current volume setting of the playback device 110 is 50 and the first increment value is 10, then the playback device 110 can adjust the volume level by applying an offset of 10 to the volume setting. Namely, the playback device 110 can increase the current volume setting by the offset value when the first direction corresponds to an increase in volume, and the playback device 110 can decrease the current volume setting by the offset value when the first direction corresponds to a decrease in volume. In other examples, the playback device 110 can determine a new volume setting based on the first increment value and then change the current volume setting to the new volume setting. Using the previous example in which the current volume setting is 50 and the first increment value is 10, the playback device 110 can determine the new volume setting to be 60 when the first direction corresponds to an increase in volume, and the playback device 110 can determine the new volume setting to be 40 when the first direction corresponds to a decrease in volume. In either case, the playback device 110 can then change the current volume setting to the new volume setting.

At block 406, the playback device 110 receives a second volume command to adjust the volume level of audio playback by the playback device 110 in a second direction. Similar to the first direction, the second direction corresponds to either a volume increase (i.e., in the "volume up" direction) or a volume decrease (i.e., in the "volume down" direction). In some examples, the second direction is different from the first direction. For instance, the first direction can correspond to a volume increase and the second direction can correspond to a volume decrease, or the first direction can correspond to a volume decrease and the second direction can correspond to a volume increase. In other examples, the second direction is the same as the first direction. For instance, both the first and second directions can correspond to a volume increase, or both the first and second directions can correspond to a volume decrease.

The playback device 110 can receive the second volume command in the same or similar manner as receiving the first volume command. For instance, the playback device 110 can receive the second volume command by way of a voice command received via one or more microphones of the playback device 110, a tactile input received via the user interface 113 of the playback device 110, or a user input provided via a user interface of a controller.

At block 408, the playback device 110 determines that the second volume command was received within a threshold period of time after receiving the first volume command. The threshold period of time can be some predetermined time duration, such as a fixed number of seconds (e.g., 3 seconds, 5 seconds, 10 seconds, etc.). In some examples, the period of time may be a relatively short period of time, as receiving multiple volume commands within a short period of time may indicate that the response of the playback device 110 to the first volume command was not satisfactory to the listener.

Further, in some examples, the period of time can be a user-defined period of time. For instance, a user may specify a value of the period of time (e.g., by way of a user input provided via a user interface of a controller associated with the playback device 110), and the playback device 110 can store the specified value and use the stored specified value when determining whether the second volume command was received within a threshold period of time after receiving the first volume command.

Still further, in some examples, the period of time can be a dynamic period of time that varies depending on the circumstances of the first and/or second volume commands. For instance, the playback device 110 can be configured to use different values for the period of time depending on the type of the first and/or second volume commands. As one example, the playback device 110 can use a first value for the period of time when the first volume command is a voice command and a second value for the period of time when the first volume command is a different type of command, such as a touch input. In such examples, the playback device 110 can be configured to apply a longer period of time when the volume commands are voice commands, as it may take a user longer to issue a voice command than to provide a touch input.

In some examples, the playback device 110 can be configured to provide an indication of the period of time. For instance, the playback device 110 can be configured to output a visual indication via the user interface 113, such as by turning on an indicator light or setting an indicator light to a particular color, throughout the duration of the period of time. The playback device 110 can be configured to output indications taking other forms as well, such as audio indications or other types of visual indications. Further, one or more other devices in the media playback system with the playback device 110, such as a controller or a playback device that is synchronously grouped with the playback device 110, can be similarly configured to output such indications of the period of time. In such implementations, a user could determine that any volume adjustment command input while the indication is active would cause the playback device 110 to engage in the dynamic volume increment processes disclosed herein.

At block 410, based on both (i) the determination that the second volume command was received within the threshold period of time after receiving the first volume command and (ii) the second volume command itself, the playback device 110 causes the volume level of the audio playback to be adjusted in the second direction by a second increment that is different from the first increment. The playback device 110 can adjust the volume level of the audio playback in the second direction at block 410 in the same or similar manner as adjusting the volume level in the first direction at block 404. For instance, the playback device 110 can apply an offset value to a current volume setting, where the offset value corresponds to the second increment, or the playback device 110 can determine a new volume setting based on the second increment value and then change the current volume setting to the new volume setting.

As noted above, the first increment and the second increment can be different from one another, such that the playback device 110 provides a dynamic volume increment adjustment when adjusting the volume level in the second direction. In some examples, the second increment is less than the first increment. This can be useful in scenarios where the first increment is larger than the user's desired volume adjustment. For instance, as noted above, when adjusting the volume setting in the first direction by the first increment, the new volume setting may overshoot the user's desired volume setting and may cause the playback volume to be too loud or too quiet. The user may then attempt to correct the volume by issuing the second volume command to adjust the volume setting in the second direction, which is opposite of the first direction in this scenario. Using a smaller value for the second increment can help the user fine-tune the volume setting to correct for the overshoot and better align with the user's desired volume setting.

In other examples, the second increment is greater than the first increment. This can be useful in scenarios where the first increment is smaller than the user's desired volume adjustment. For instance, as noted above, when adjusting the volume setting in the first direction by the first increment, the new volume setting may undershoot the user's desired volume setting. The user may then attempt to further adjust the volume by issuing the second volume command to adjust the volume setting in the second direction, which is the same as the first direction in this scenario. Using a larger value for the second increment can help the user arrive at the desired volume setting more quickly by reducing the number of required volume adjustment commands.

In some examples, the playback device 110 can dynamically determine the value of the second increment. One way to dynamically determine the value of the second increment is for the playback device 110 to set the value of the second increment based on the respective first and second directions of the volume adjustments. As noted above, it can be useful to apply a smaller second increment when the first and second directions are different directions (e.g., when the volume adjustment in the first direction overshoots the user's desired volume setting and the user attempts to correct the overshoot by adjusting the volume in the opposite second direction), and it can be useful to apply a larger second increment when the first and second directions are the same direction (e.g., when the volume adjustment in the first direction undershoots the user's desired volume setting and the user attempts to correct the undershoot by continuing to adjust the volume in the same direction). As such, the playback device 110 can be configured to determine whether the first and second directions are different or the same and, based on this determination, determine a value for the second increment. When the determination is that the first and second directions are different, the playback device 110 can determine the second increment to be a value that is less than the first increment. When the determination is that the first and second directions are the same, the playback device 110 can determine the second increment to be a value that is greater than the first increment.

In some examples, the playback device 110 can determine the value of the first and/or second increments based on information received from a remote computing device configured to communicate with the playback device 110. For instance, the remote computing device can include a controller that sends volume configuration information to the playback device 110. The playback device 110 can receive the volume configuration information and use the volume configuration information as a basis to determine values for one or both of the first and second increments. In such examples, the volume configuration information can include user-defined information. For instance, a user can input predefined values for the first and/or second increments via a user interface of the controller, and the controller can provide the user-defined values to the playback device 110.

In some examples, the playback device 110 can be configured to further dynamically adjust the volume increment settings in additional iterations beyond those depicted in FIG. 4. For instance, while FIG. 4 depicts only two volume commands with corresponding incremental volume adjustments, the techniques described in connection with FIG. 4 can be applied to any number of volume commands with corresponding incremental volume adjustments. For instance, after block 410, the playback device 110 can receive a third volume command to adjust the volume level in a third direction, and if the playback device 110 receives the third command within the threshold period of time after receiving the second command, then the playback device 110 can apply any of the techniques described above to dynamically adjust the value of a third volume setting increment corresponding to the third command. The playback device 110 can take similar action with a fourth volume command, and so on.

While the techniques depicted in FIG. 4 are described in connection with a single playback device 110, it should also be understood that these techniques can similarly be applied when the playback device 110 is included in a group of playback devices configured to synchronously play back audio content. For instance, at block 404, if the playback device 110 is part of a synchrony group that includes a second playback device, the playback device 110 can cause, based on the first volume command received by the playback device 110, a respective volume level of audio playback of the second playback device to be adjusted in the first direction by the first increment. Likewise, at block 410, the playback device 110 can be configured to cause, based on (a) determining that the second volume command was received by the playback device 110 within the threshold period of time and (b) the second volume command, the respective volume level of the audio playback of the second playback device to be adjusted in the second direction by the second increment.

Further, when the playback device 110 is part of a synchrony group, some or all of the techniques described in connection with FIG. 4 can be carried out by other devices in the synchrony group. In some examples, one or both of the first and second volume commands can stem from user inputs provided to devices other than the playback device 110. For instance, the playback device 110 can receive the first volume command based on user input provided via its user interface 113, and the playback device 110 can receive the second volume command based on user input provided via a user interface of a different playback device in the synchrony group.

Still further, while FIG. 4 describes various techniques being carried out by the playback device 110, some or all of the techniques can additionally or alternatively be carried out by one or more other computing devices configured to communicate with the playback device 110. For instance, in some examples, some or all of the techniques of FIG. 4 can be carried out by a controller, such as any of the control devices 130 depicted in FIGS. 1A, 1B, and 1G-1I, configured to control various aspects of media playback by the playback device 110.

FIG. 4 includes one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowchart shown in FIG. 4 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long-term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the processes and methods disclosed herein, each block in FIG. 4 may represent circuitry and/or machinery that is wired or arranged to perform the specific functions in the process.

Figure 5A:
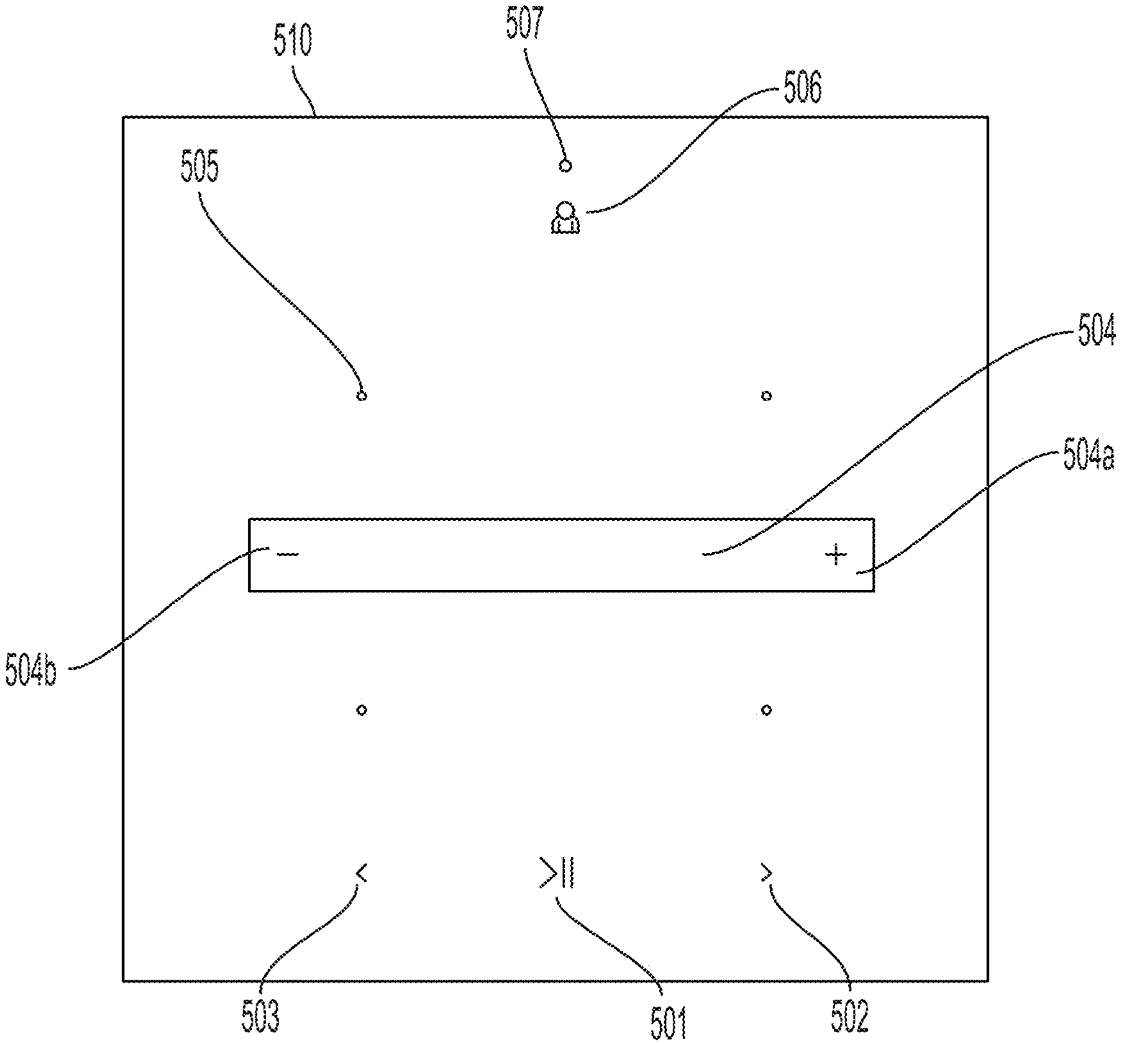
FIG. 5A is a schematic diagram of an example user interface on a playback device.

Turning to FIG. 5A, an example hardware user interface is shown on a playback device 510. The hardware user interface includes a play/pause button 501, a skip forward button 502, and a skip backward button 503. On the playback device 510, these three transport control buttons take the form of capacitive touch controls, however physical buttons are also possible. Also included is one or more microphones 505, a voice assistant control button 506, and an associated LED 507, which may be illuminated when a voice assistant service is active and unilluminated when it is not.

The hardware user interface of the playback device 510 also includes a volume control bar 504, which may be centrally-located and may take the form of a groove or depression that includes a capacitive touch surface therein. The volume control bar 504 also includes, at opposite ends of the groove, a volume up button 504*a* and a volume down button 504*b*. The volume control bar 504 may provide for a gradient-type of volume control that can be adjusted by sliding a finger horizontally within the groove, and the buttons 504*a* and 504*b* may provide for incremental volume adjustments that may be used for fine tuning, as discussed above. Still further, if a user performs a long-press on the volume up button 504*a*, it may effect a rapid ramp-up to a maximum volume (or user-defined volume limit) of the playback device 510, and similarly with a rapid ramp-down to a minimum (e.g., zero volume, user-defined minimum, etc.) volume of the playback device 510 if a long-press is performed on the volume down button 504*b*.

Figure 5B:
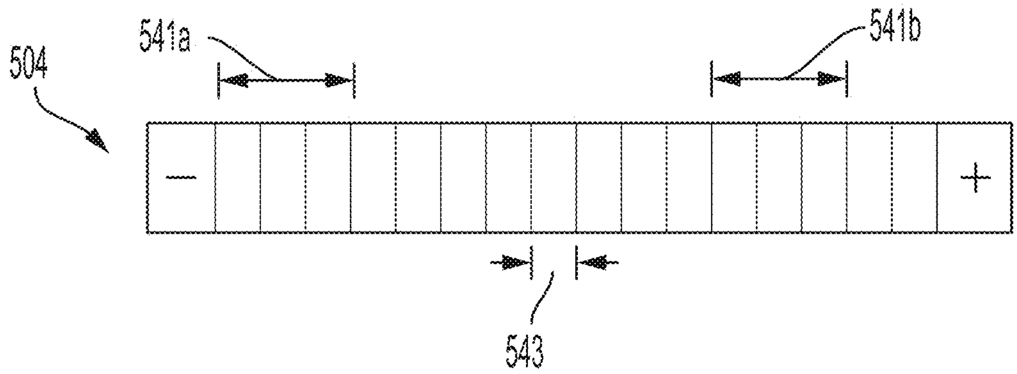
FIG. 5B is a schematic diagram of a volume control bar of the example user interface of FIG. 5A.

In some implementations, volume adjustments that are performed on the volume control bar 504 by sliding a finger horizontally within the groove may be relative adjustments, meaning that volume levels are not tied to any specific location along the volume control bar 504. Referring to FIG. 5B by way of example, if a user slides their finger for a given distance at a first location 541*a* on the volume control bar 504, the resulting volume adjustment would be the same as the resulting volume adjustment made by the user sliding their finger for the same distance at a second location 541*b*.

The level of volume change that results from sliding a finger across a given distance may depend on various factors including the size of the playback device 510, which may influence the available length of the volume control bar 504 and the resulting volume scale that may be used. In general, however, a given distance (e.g., measured in millimeters (mm)) may correspond to a given percentage of volume adjustment. For instance, a slide distance of 20 mm may correspond to volume adjustment of 8% (e.g., an adjustment from 50% volume to 58% volume). To effect this volume scale, the playback device 510 may process movements along the volume control bar 504 in 5 mm increments, each of which may correspond to a 2% volume change. This can be seen by way of example in FIG. 5B, where the volume control bar 504 is divided into equally spaced increments 543.

In some implementations, the level of volume change that results from a given movement may also be based on the speed at which the user moved their finger, allowing the user to effectively alter the default volume scale that is used for the volume control bar 504. Movements that are faster than a "default" speed may result in a greater relative volume change, while slower, more deliberate movements may result in a lesser relative volume change.

Figure 5C:
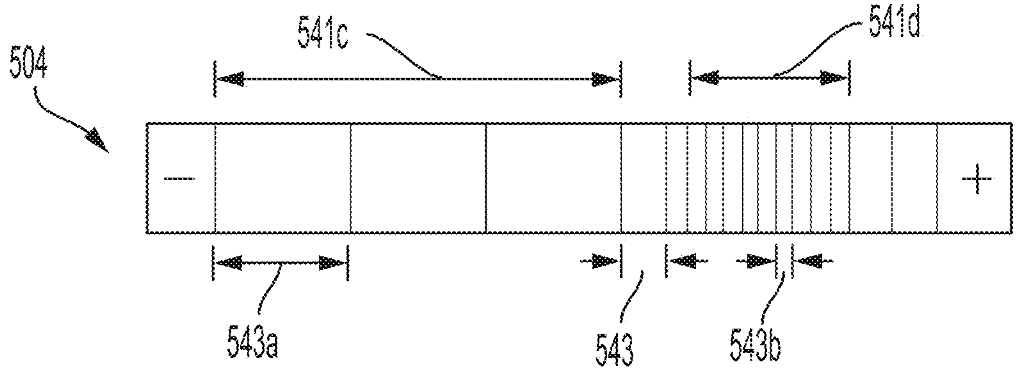
FIG. 5C is another schematic diagram of the volume control bar of FIG. 5A.

FIG. 5B shows one possible example of how the playback device 510 may adjust the volume scale of the volume control bar 504 based on the speed of a user's movements. In a first scenario, the playback device 510 may detect that the user moved their finger relatively quickly over a distance 541*c*. The speed of the user's movement (e.g., measured in mm per second), may imply that the user wishes to increase (or decrease) the volume quickly, and by a relatively large amount. Thus, the playback device 510 may adjust the increment at which the user's movement is processed, as well as assign a new percentage volume change to the new macro-increments. For instance, as shown in FIG. 5C, the playback device 510 may process the user's movements at macro-increments 543*a* that are 25 mm (as opposed to at increments 543 that are 20 mm), each of which may correspond to a 12% volume change. In this way, the user may achieve a greater volume change (e.g., by a factor of 2) than if the user had slid their finger for the same distance at the default speed.

In the opposite scenario, the playback device 510 may detect that the user moved their finger relatively slowly over a distance 541*d*, as shown in FIG. 5C. In this case, the speed of the user's movement may imply that the user wishes to increase (or decrease) the volume slowly, and in such a way that relatively small volume changes can be perceived. Thus, the playback device 510 may adjust the increment at which the user's movement is processed, as well as assign a new percentage volume change to the new micro-increments. For instance, as shown in FIG. 5C, the playback device 510 may process the user's movements at micro-increments 543*b* that are 2.5 mm, each of which may correspond to a 0.5% volume change. Accordingly, the user may perceive a more granular volume adjustment than if the user had slid their finger for the same distance at the default speed.

Numerous other volume control scenarios are also possible, including examples in which a user might change the speed at which they slide their finger along the volume control bar 504. Further, the playback device 510 might adjust the volume scale of the volume control bar 504 based on the speed of a user's movements in other ways as well.

When a user executes a volume control command via the hardware interface shown in FIG. 5, the playback device 510 may provide audible volume control feedback to indicate the volume change. For example, each time a user presses either the volume up button 504*a* or the volume down button 504*b*, the playback device 510 may play back a brief audible feedback audio tone providing an indication of the volume change.

However, if this approach is implemented for a gradient volume change that is applied via the volume control bar 504, it may provide a counter-intuitive audible result. For instance, if a user executes a volume up command by sliding their finger across the volume control bar 504—which might equate to change in volume corresponding to several single presses of the volume up button 504*a*—a single audible feedback tone that is provided at the conclusion of the volume change may confuse the user by implying that only a single incremental volume change was executed, rather than several increments at once.

For this reason, the playback device 510 may dynamically adjust the audible volume control feedback that it provides to indicate volume changes that are executed by a user via the hardware interface shown in FIG. 5A. In particular, the playback device 510 may detect that a gradient volume control command is being executed via the volume control bar 504 and may play back multiple instances of the audible feedback tone in sequence during the gradient volume change, depending on the rate at which the user moves their finger. In some cases, if the playback device 510 detects that the user is moving their finger relatively rapidly, the playback device 510 may play back a shortened version of the audible feedback tone multiple times in close succession, resulting in a collective audible feedback sound (e.g., resembling a "zip") that implies the volume change encompassed several volume increments.

This type of dynamic adjustment of volume control feedback may be implemented in various ways. For instance, the default audio feedback tone (e.g., the tone that the playback device 510 plays for single button presses) may have a given duration, such as one half of a second. In situations where a user moves their finger along the volume control bar 504 relatively slowly (e.g., at a rate measured in millimeters per second, for example), the playback device 510 may play back the audio feedback tone once every half second during the user's finger movement, or perhaps less often if the user is moving their finger particularly slowly. In any event, so long as the user continues to manipulate the volume control bar 504 (e.g., by changing directions), the playback device 510 may continue to play back instances of the audio feedback tone to signify the ongoing volume change.

In other situations, the user may move their finger relatively rapidly such that it is not in contact with the volume control bar 504 for very long (i.e., the finger is in contact with the volume control bar 504 for a relatively short period of time). Moreover, as discussed in more detail above, the playback device 510 may dynamically interpret this this type of volume input as a command for a relatively large volume change. For these reasons, the playback device 510 may play back a shortened version of the audio feedback tone, allowing it to play back more instances of the shortened feedback tone within a shorter period of time. As one example, if the user's finger is in contact with the volume control bar 504 for only one second during the rapid movement, the playback device 510 may play a shortened version of the audio feedback tone that is only one quarter-second long, such that the tone can be played four times in succession in response to the user's movement. Other examples involving other commands and shortened audio feedback tones of different lengths are also possible.

The shortened version of the audio feedback tone may take various forms. In some implementations, it may be a truncated version of the default audio feedback tone, with a portion of the corresponding audio file trimmed from the beginning, the end, or both, in order to shorten the duration of the tone. In other implementations, the default audio feedback tone may be a time-stretched version of the default audio feedback tone that reduces its duration without changing its spectral characteristics (e.g., pitch). Further, the playback device 510 may generate the shortened version of the audio feedback tone as it is needed for each given volume control command (e.g., by truncating or time-stretching the default audio file). In other examples, the playback device 510 may store multiple versions of the audio feedback tone that may be played, including the default version as well as one or more shortened versions that may be used in the manner discussed above. Other implementations are also possible.

In addition to dynamically adjusting the length of the audio feedback tone and the rate at which it may be played, the playback device 510 may additionally adjust the volume of the audio feedback tone in relation to the volume of the content that is currently being played back by the playback device 510.

For example, if the audio feedback tone is always played at the same volume regardless of the volume of the content, then it might not be audible when the playback device 510 is playing back content relatively loudly. Conversely, the audio feedback tone might overpower audio content that is being played back quietly. In either case, the volume of the audio feedback tone may not provide a productive or meaningful user experience. As another possibility, the volume of the audio feedback tone might be set proportionately to the volume of the content in a ratio that does not change (e.g., 80% of content volume). However, this may result in similar issues as those discussed above. For instance, when content is played back at a relatively quiet volume, the audio feedback tone may be so quiet that a user is not able to hear it at all. Further, when content is played back relatively loudly, the volume of the audio feedback tone may be alarmingly loud.

To address these issues, the playback device 510 may implement a relationship between the volume of the audio feedback tone and the volume of the content that is being played back, where the relationship varies depending on the current volume of the content. For instance, at moderate to higher volumes, the playback device 510 may play back the audio feedback tone at a volume that is below that of the content by a given proportion (e.g., 80%). However, the audio feedback tone may have an upper volume limit that the playback device 510 will not exceed, even if the volume audio feedback tone results in a lesser proportion of the volume of the content (e.g., 60%).

As the volume of the content decreases, the volume of the audio feedback tone may decrease accordingly. However, the audio feedback tone may also have a lower limit, representing the quietest volume at which the playback device 510 will play the audio feedback tone. For instance, if the content is being played back below the lower limit, the audio feedback tone may nonetheless be played at the volume corresponding to the lower limit, and thus louder than the content.

Figure 6:
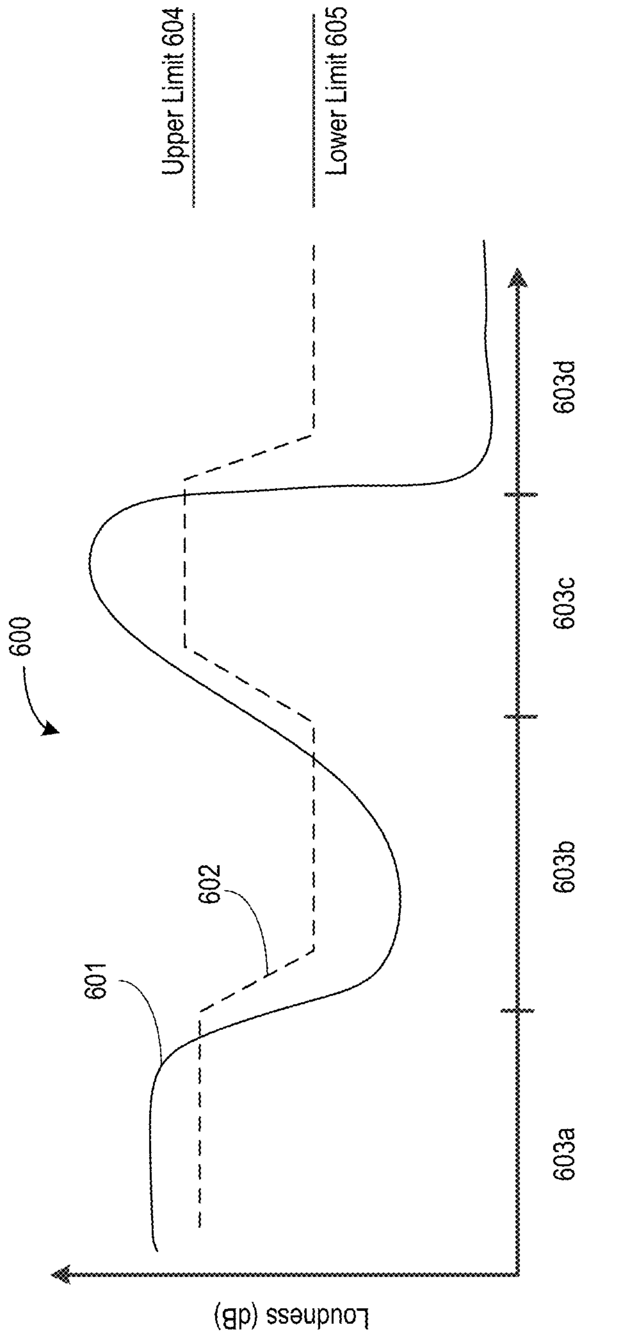
FIG. 6 is an example graph showing a relationship at various times between the loudness of content playback and the loudness of an audio feedback tone, according to an example implementation.

Turning to FIG. 6, one possible example of this type of relationship between the audio feedback tone volume and the content volume may be seen. FIG. 6 illustrates a graph 600 showing the relationship at various times between the loudness of audio content played back by a playback device, shown by the line 601, and the loudness of the audio feedback tone played back by the playback device, shown by the line 602. Four different time periods are shown in the graph 600, each corresponding to a different relationship between the loudness of the content and the loudness of the audio feedback tone.

At a first time 603*a*, the audio content may be played back at a moderate to high volume and the corresponding volume of the audio feedback tone may be set at a given percentage of the content volume, as discussed above. During a second time 603*b*, the user may reduce playback of the audio content to a relatively low volume. As shown in the graph 600, the volume of the audio feedback tone is also reduced, but does not go below a lower limit 605 for the loudness of the audio feedback tone. Consequently, the relationship between the audio content playback and the audio feedback tone is inverted during the second time 603*b*.

Moving to a third time 603*c*, the user may raise the volume of the audio content to a relatively loud volume. The volume of the audio feedback tone is also increased, but not beyond the upper limit 604 for the loudness of the audio feedback tone. In this situation, the volume of the audio feedback tone is again less than the volume of the content, but now at a lesser percentage than it was during the first time 603*a*.

Turning to a fourth time 603*d*, the user may pause the playback of the audio content. However, the volume level of the playback device may still be adjusted in such a state. In these situations, the playback device may set the volume of the audio feedback tone to be at the lower limit 605.

It will be understood that the graph 600 illustrates one possible example of the relationships between content volume and audio feedback volume that may be defined by a given playback device. Various other examples are also possible.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Further, in light of the above detailed description, the present disclosure contemplates the following example features:

(Feature 1) A method carried out by a playback device, the method comprising: (i) receiving a first volume command to adjust a volume level of audio playback by the playback device in a first direction, (ii) based on the first volume command, causing the volume level of the audio playback to be adjusted in the first direction by a first increment, (iii) receiving a second volume command to adjust the volume level of the audio playback in a second direction, (iv) determining that the second volume command was received within a threshold period of time after receiving the first volume command, and (v) based on (a) determining that the second volume command was received within the threshold period of time and (b) the second volume command, causing the volume level of the audio playback to be adjusted in the second direction by a second increment that is different from the first increment.

(Feature 2) The method of feature 1, wherein the first volume command comprises a command to increase the volume level, the second volume command comprises a command to decrease the volume level, and the second increment is less than the first increment.

(Feature 3) The method of feature 1, wherein the second direction matches the first direction, and wherein the second increment is greater than the first increment.

(Feature 4) The method of feature 1, wherein the second increment is less than the first increment.

(Feature 5) The method of feature 1, wherein the playback device comprises at least one microphone, and wherein at least one of (i) receiving the first volume command or (ii) receiving the second volume command comprises detecting a voice input via the at least one microphone.

(Feature 6) The method of feature 1, wherein the playback device comprises a user interface, and wherein at least one of (i) receiving the first volume command or (ii) receiving the second volume command comprises detecting a user input via the user interface.

(Feature 7) The method of feature 1, wherein at least one of (i) receiving the first volume command or (ii) receiving the second volume command comprises receiving a volume command from a computing device configured to communicate with the playback device.

(Feature 8) The method of feature 1, wherein the playback device is a first playback device that is part of a synchrony group including a second playback device, and wherein the method further comprises (i) based on the first volume command, causing a respective volume level of audio playback of the second playback device to be adjusted in the first direction by the first increment; and (ii) based on (a) determining that the second volume command was received within the threshold period of time and (b) the second volume command, causing the respective volume level of the audio playback of the second playback device to be adjusted in the second direction by the second increment.

(Feature 9) The method of feature 8, wherein the first volume command comprises a voice input that is detected by a network microphone device of the first playback device, and wherein the second volume command comprises a user input that is received via an interface the second playback device.

(Feature 10) The method of feature 1, wherein the second increment is dynamically determined by the playback device.

(Feature 11) The method of feature 1, further comprising determining at least one of the first or second increments based on volume configuration information received from a control device configured to communicate with the playback device.

(Feature 12) The method of feature 1, wherein the first and second increments are received from a remote computing device configured to communicate with the playback device.

(Feature 13) A non-transitory computer-readable medium, wherein the non-transitory computer-readable medium is provisioned with program instructions that, when executed by at least one processor, cause a playback device to perform the method of one of features 1 to 12.

(Feature 14) A playback device comprising a network interface, at least one processor, a non-transitory computer-readable medium, and program instructions stored on the non-transitory computer-readable medium that are executable by the at least one processor such that the playback device is configured to perform the method of one of features 1 to 12.

The invention claimed is:

1. A playback device comprising:

a network interface;

at least one processor;

a non-transitory computer-readable medium; and program instructions stored on the non-transitory computer-readable medium that are executable by the at least one processor such that the playback device is configured to:

receive a first volume command to adjust a volume level of audio playback by the playback device in a first direction;

based on the first volume command, cause the volume level of the audio playback to be adjusted in the first direction by a first increment;

receive a second volume command to adjust the volume level of the audio playback in a second direction;

determine that the second volume command was received within a threshold period of time after receiving the first volume command; and based on (i) determining that the second volume command was received within the threshold period of time and (ii) the second volume command, cause the volume level of the audio playback to be adjusted in the second direction by a second increment that is different from the first increment, wherein the second direction matches the first direction, and wherein the second increment is greater than the first increment.

2. The playback device of claim 1, further comprising:

at least one microphone, wherein at least one of (i) the program instructions that are executable by the at least one processor such that the playback device is configured to receive the first volume command or (ii) the program instructions that are executable by the at least one processor such that the playback device is configured to receive the second volume command comprise program instructions that are executable by the at least one processor such that the playback device is configured to detect a voice input via the at least one microphone.

3. The playback device of claim 1, further comprising:

a user interface, wherein at least one of (i) the program instructions that are executable by the at least one processor such that the playback device is configured to receive the first volume command or (ii) the program instructions that are executable by the at least one processor such that the playback device is configured to receive the second volume command comprise program instructions that are executable by the at least one processor such that the playback device is configured to detect a user input via the user interface.

4. The playback device of claim 1, wherein at least one of (i) the program instructions that are executable by the at least one processor such that the playback device is configured to receive the first volume command or (ii) the program instructions that are executable by the at least one processor such that the playback device is configured to receive the second volume command comprise program instructions that are executable by the at least one processor such that the playback device is configured to receive a volume command from a computing device configured to communicate with the playback device.

5. The playback device of claim 1, wherein the playback device is a first playback device that is part of a synchrony group including a second playback device, the first playback device further comprising program instructions stored on the non-transitory computer-readable medium that are executable by the at least one processor such that the first playback device is configured to:

based on the first volume command, cause a respective volume level of audio playback of the second playback device to be adjusted in the first direction by the first increment; and based on (i) determining that the second volume command was received within the threshold period of time and (ii) the second volume command, cause the respective volume level of the audio playback of the second playback device to be adjusted in the second direction by the second increment.

6. The playback device of claim 5, wherein the first volume command comprises a voice input that is detected by a network microphone device of the first playback device, and wherein the second volume command comprises a user input that is received via an interface of the second playback device.

7. The playback device of claim 1, wherein the second increment is dynamically determined by the playback device.

8. The playback device of claim 1, further comprising program instructions stored on the non-transitory computer-readable medium that are executable by the at least one processor such that the playback device is configured to:

determine at least one of the first or second increments based on volume configuration information received from a control device configured to communicate with the playback device.

9. The playback device of claim 1, wherein the first and second increments are received from a remote computing device configured to communicate with the playback device.

10. A non-transitory computer-readable medium, wherein the non-transitory computer-readable medium is provisioned with program instructions that, when executed by at least one processor, cause a playback device to:

receive a first volume command to adjust a volume level of audio playback by the playback device in a first direction;

based on the first volume command, cause the volume level of the audio playback to be adjusted in the first direction by a first increment;

receive a second volume command to adjust the volume level of the audio playback in a second direction;

determine that the second volume command was received within a threshold period of time after receiving the first volume command; and based on (i) determining that the second volume command was received within the threshold period of time and (ii) the second volume command, cause the volume level of the audio playback to be adjusted in the second direction by a second increment that is different from the first increment, wherein the second direction matches the first direction, and wherein the second increment is greater than the first increment.

11. The non-transitory computer-readable medium of claim 10, wherein the playback device comprises at least one microphone, and wherein at least one of (i) the program instructions that, when executed by the at least one processor, cause the playback device to receive the first volume command or (ii) the program instructions that, when executed by the at least one processor, cause the playback device to receive the second volume command comprise program instructions that, when executed by at least one processor, cause the playback device to detect a voice input via the at least one microphone.

12. A method carried out by a playback device, the method comprising:

receiving a first volume command to adjust a volume level of audio playback by the playback device in a first direction;

based on the first volume command, causing the volume level of the audio playback to be adjusted in the first direction by a first increment;

receiving a second volume command to adjust the volume level of the audio playback in a second direction;

determining that the second volume command was received within a threshold period of time after receiving the first volume command; and based on (i) determining that the second volume command was received within the threshold period of time and (ii) the second volume command, causing the volume level of the audio playback to be adjusted in the second direction by a second increment that is different from the first increment, wherein the second direction matches the first direction, and wherein the second increment is greater than the first increment.

13. The method of claim 12, wherein the playback device comprises at least one microphone, and wherein at least one of (i) receiving the first volume command or (ii) receiving the second volume command comprises detecting a voice input via the at least one microphone.

14. The method of claim 12, wherein the playback device comprises a user interface, and wherein at least one of (i) receiving the first volume command or (ii) receiving the second volume command comprises detecting a user input via the user interface.

15. The method of claim 12, wherein at least one of (i) receiving the first volume command or (ii) receiving the second volume command comprises receiving a volume command from a computing device configured to communicate with the playback device.

16. The method of claim 12, wherein the playback device is a first playback device that is part of a synchrony group including a second playback device, the method further comprising:

based on the first volume command, causing a respective volume level of audio playback of the second playback device to be adjusted in the first direction by the first increment; and based on (i) determining that the second volume command was received within the threshold period of time and (ii) the second volume command, causing the respective volume level of the audio playback of the second playback device to be adjusted in the second direction by the second increment.

17. The method of claim 16, wherein the first volume command comprises a voice input that is detected by a network microphone device of the first playback device, and wherein the second volume command comprises a user input that is received via an interface of the second playback device.

18. The method of claim 12, wherein the second increment is dynamically determined by the playback device.

19. The method of claim 12, further comprising:

determining at least one of the first or second increments based on volume configuration information received from a control device configured to communicate with the playback device.

20. The method of claim 12, wherein the first and second increments are received from a remote computing device configured to communicate with the playback device.

* * * * *